United States Patent [19]
Von Kaler

[11] Patent Number: 6,119,819
[45] Date of Patent: Sep. 19, 2000

[54] ENCASED TRANSAXLE BRAKE

[75] Inventor: Roland Von Kaler, Tecumseh, Mich.

[73] Assignee: Von Kaler Corporation, Tecumseh, Mich.

[21] Appl. No.: 08/917,304

[22] Filed: Aug. 25, 1997

[51] Int. Cl.[7] .............................................. F16D 55/228
[52] U.S. Cl. ........................................................ 188/71.5
[58] Field of Search .............................. 74/606 R, 411.5, 74/376; 188/71.5, 196 V, 196 M, 1.11 R, 1.11 W; 192/4 A

[56] References Cited

U.S. PATENT DOCUMENTS

| | | | |
|---|---|---|---|
| 2,953,040 | 9/1960 | Christenson | 188/71.5 |
| 4,487,301 | 12/1984 | Harrison | 188/71.5 |
| 4,662,241 | 5/1987 | Edwards | 74/371 |
| 5,000,056 | 3/1991 | Crawford et al. | 74/371 |
| 5,174,420 | 12/1992 | DeWald | 188/71.5 |
| 5,593,000 | 1/1997 | Johnson | 180/305 |
| 5,626,204 | 5/1997 | Johnson | 180/305 |
| 5,689,955 | 11/1997 | Hauser et al. | 60/442 |
| 5,768,892 | 6/1998 | Houser | 74/371 |

FOREIGN PATENT DOCUMENTS

| | | | |
|---|---|---|---|
| 57139 | 3/1921 | Sweden | 188/72 |

*Primary Examiner*—Paul N. Dickson
*Assistant Examiner*—Melanie Talavera
*Attorney, Agent, or Firm*—Young & Basile, P.C.

[57] ABSTRACT

A transaxle drive unit including transmission gearing and drive wheel shafts interconnected by differential gearing all located within a casing. The novelty constituting brake apparatus directly mounted on a wheel drive shaft and located within the casing and installed simultaneously with the associated drive shafts.

10 Claims, 2 Drawing Sheets

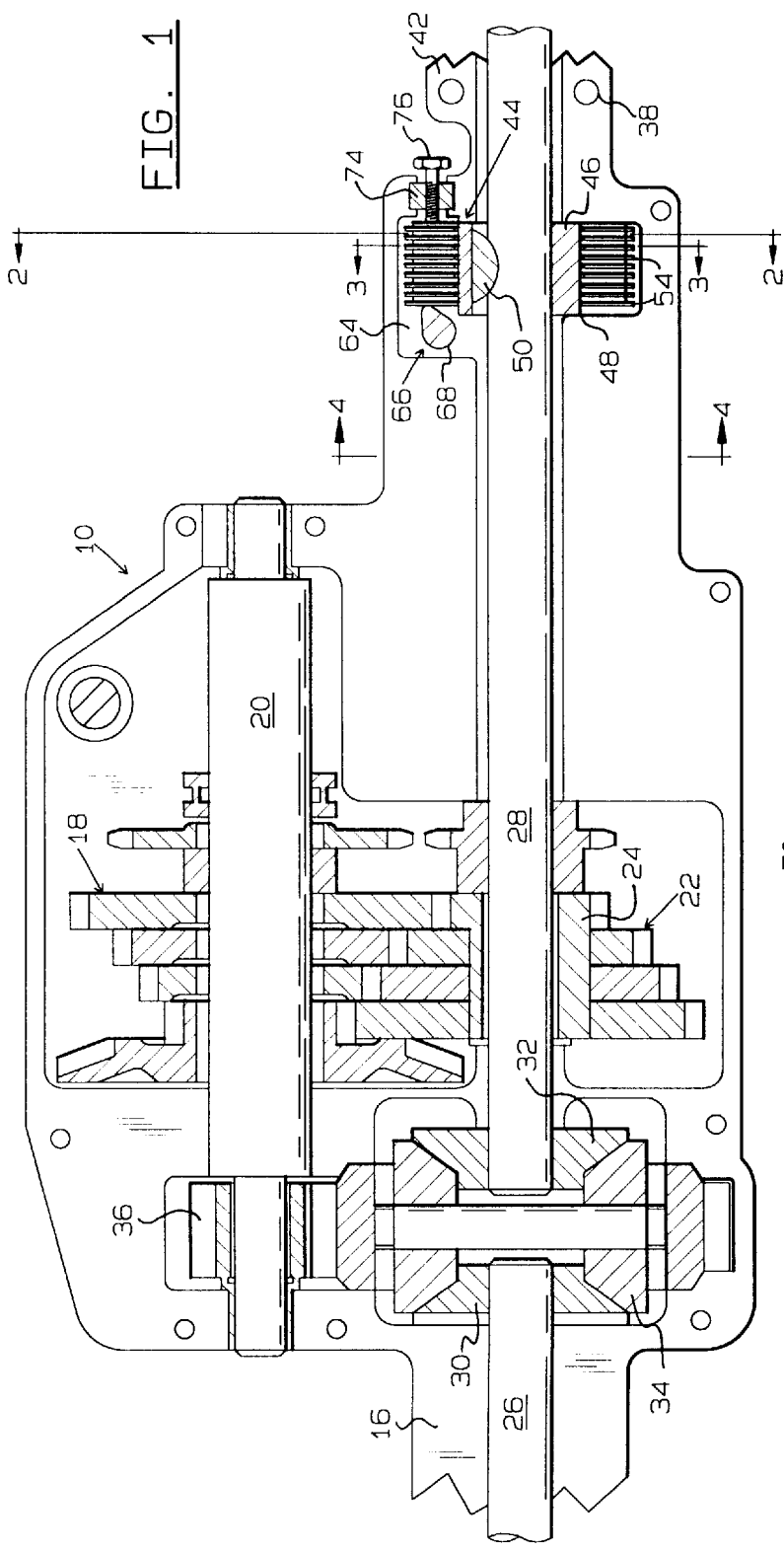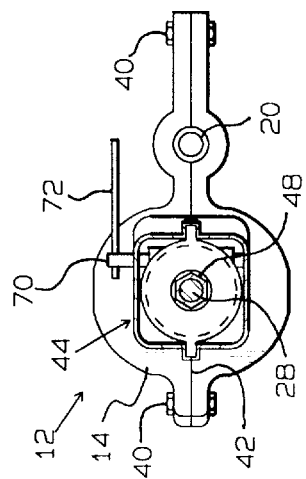

ENCASED TRANSAXLE BRAKE

BACKGROUND OF THE INVENTION

1. Field of the Invention

The invention pertains to transaxle drive units consisting of transmission gearing and wheel drive shafts enclosed within removable casing components.

2. Description of the Related Art

Transaxle transmissions are often utilized with small utility vehicles such as riding lawnmowers, small garden tractors, and the like. Such vehicles combine the transmission gearing with the wheel drive shafts and associated differential wherein the transmission gearing as well as the wheel drive shaft differential gearing are located within a common housing. Such a combination of a transmission, differential and drive wheel shaft are commonly called "transaxles" and are widely used with small vehicles due to economy of manufacture and assembly.

Typical transaxle constructions and utilization are shown in U.S. Pat. Nos. 3,311,186; 4,662,241 and 4,673,055.

As transaxles are commonly used with small utility vehicles, it is necessary to incorporate wheel brake structure with the vehicle drive mechanism, and with transaxles, such brakes usually include a disc or drum shaft extending from the transaxle housing and rotated by the transmission gearing, and a brake shoe or disc selectively frictionally engages with the drum or disc to brake the rotation of the associated transmission gearing, and vehicle. Such commonly utilized transaxle braking systems are mounted exteriorly of the transmission housing, and have the disadvantage of being located in the transmission path outside of the interconnection of the wheel drive shafts and the differential. Accordingly, even though the brake structure may be fully applied and "locked up", it is possible for the vehicle wheels to rotate in opposite directions through the interconnecting differential, as may happen on slopes, particularly when the grass or terrain is wet or slippery. Such failure of the brake to adequately control vehicle movement raises serious safety ramifications as under such conditions the vehicle brake becomes inoperative with respect to stopping vehicle movement.

In previously known transaxle constructions, such as typified in the above mentioned patents, transaxles utilizing differentially connected wheel drive shafts only permit safe braking if the drive shaft tires are upon a dry surface which is often not the case with riding lawnmowers and small tractors.

Transaxle housings are usually defined by two casings bolted together along a flat assembly surface, and as the bolt-together casing parts are relatively large, the internal transaxle components may be easily assembled within the housing. Particularly, ease of assembly is experienced when the assembly surface plane constitutes a diameter of the wheel drive shafts whereby the drive shafts may be "dropped into" the lower casing with minimal assembly time required. However, previously, brake structure has not been available for transaxle units capable of truly braking the vehicle drive wheels under all conditions and situations, or wherein the brake structure is incorporated within the transaxle housing and casing configuration.

OBJECTS OF THE INVENTION

It is a purpose of the invention to provide a transaxle drive unit wherein a brake is fully encased within the transaxle housing, and is directly associated with a wheel drive shaft.

Another object of the invention is to provide a transaxle drive unit brake assembly which is directly associated with a vehicle wheel drive shaft and which is assembled within the transaxle housing simultaneously with assembly of the associated wheel drive shaft within the housing.

A further object of the invention is to provide a transaxle drive unit including coaxial wheel drive shafts interconnected by differential gearing wherein the transaxle housing casing components include an assembly or split surface lying within a plane diametrical to the drive shafts wherein the brake assembly is simultaneously installed within the housing casing with the associated drive shaft in a "drop in" manner.

Yet another object of the invention is to provide a transaxle drive unit brake assembly for coaxial mounting upon a vehicle drive shaft and encased within the transaxle housing when the brake assembly is of an inexpensive construction, dependable in operation, and effective to provide braking over an extended time period.

SUMMARY OF THE INVENTION

A transaxle drive unit in accord with the inventive concepts consists of a housing defined by casing components bolted together along flat assembly surfaces. A gasket may be employed between the assembly surfaces as lubricating oil is normally located within the transaxle housing, and the housing encases transmission gearing drivingly connected to drive shafts constituting axles for the vehicle in which the transaxle is utilized.

The inventive concept is employed in a transaxle unit wherein casing assembly surfaces define a plane substantially constituting a diameter of the axially coaligned wheel drive shafts axles. This construction requires that the casing assembly surfaces include semi-cylindrical recesses for receiving bearings for the drive shafts, and as the casing assembly surfaces substantially constitute a diameter of the drive shaft, the drive shafts may be readily assembled into the housing casing by merely "dropping in" the drive shaft and bearings into a casing. Upon the complementary casing being aligned, the casings are interconnected by bolts firmly supporting the drive shafts within the transaxle housing. Usually, the axially aligned wheel drive shafts are interconnected by differential gearing driven from the transmission gears within the transaxle housing, and a casing utilizing assembly surfaces diametrically related to the drive shafts permits the differential to be quickly assembled within the housing.

In the practice of the invention, a brake assembly is mounted upon one or both of the wheel drive shafts prior to locating the drive shaft within the transaxle casing. The brake assembly consists of a plurality of alternately stacked discs and shoes both of a sheet metal construction. The discs are keyed to the drive shaft for rotation therewith, and are capable of axial limited movement on the associated shaft. The shoes include stops which engage abutments defined on the housing casings preventing the shoes from rotating about the axis of the shafts, and the shoes are also capable of limited axial movement as determined by an adjustable compression stop which can be adjusted to compensate for wear. A brake actuator in the form of a cam, screw, or the like, engages the outermost shoe and is capable of imposing an axial force upon the engaged shoe which compresses the disc and shoe stack against the compression stop placing these elements in a frictional relationship to each other to provide the braking action.

The brake assembly is economical to manufacture in view of its use of sheet metal discs and shoes which may be formed of stamped metal, and while the discs will include a non-circular opening for complementary cooperation with a non-circular hub defined on the associated shaft, and the shoes include radially extending stops for engaging casing ledges, the non-circular disc and stop configurations may be readily defined during the stamping operation. The stack of discs and shoes is easily assembled upon the associated drive shaft prior to installing the drive shaft within the housing casing, and once the brake assembly is in place, it will be dropped into its cavity defined in the housing casing simultaneously with the location of the associated wheel drive shaft within the casing. Accordingly, the assembly of the brake unit on the shaft and subsequent location of the associated drive shaft and brake within the housing casing requires little time and is economically advantageous with respect to assembly of prior transaxle braking devices.

Upon the transaxle housing casings being bolted together, the brake shoe stops will be resting upon ledges defined within the casings to prevent shoe rotation, and during operation of the vehicle in which the transaxle unit is located, actuation of the brake assembly actuator, either of the cam, screw or other type, compresses the stack of discs and shoes producing a frictional interrelationship which directly brakes the wheel drive shaft against rotation. Release of compression of the disc and shoes permits the wheel drive shaft to resume rotation with no frictional power loss.

It will be appreciated that the aforedescribed transaxle brake assembly may be economically fabricated and easily assembled upon the associated drive shaft and located within the transaxle housing. The use of a plurality of discs and shoes provides very effective drive shaft braking, and as the brake is directly associated with the wheel drive shaft, the brake is capable of directly restricting rotation of the vehicle wheel, and those deficiencies of prior transaxle drive units which do not provide positive braking under adverse conditions are overcome.

BRIEF DESCRIPTION OF THE DRAWINGS

The aforementioned objects and advantages of the invention will be appreciated from the following description and accompanying drawings wherein:

FIG. 1 is a plan view of the lower casing of a typical transaxle drive unit utilizing the concepts of the invention, FIG. 2 is an elevational sectional view taken along Section 2—2 of FIG. 1.

DESCRIPTION OF THE PREFERRED EMBODIMENTS

Figure 3:
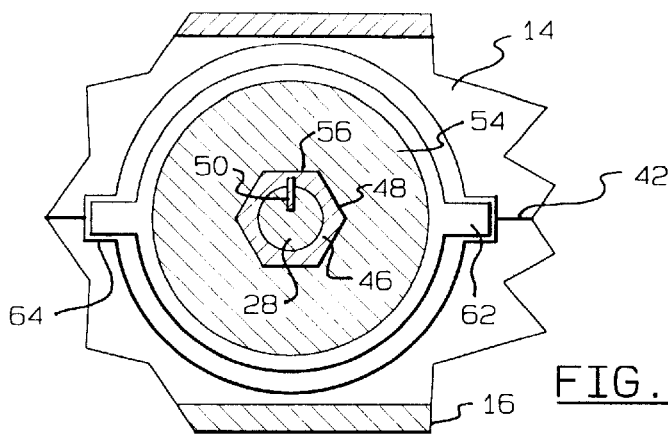
FIG. 3 is an enlarged elevational sectional view taken along Section 3—3 of FIG. 1.

With reference to FIG. 1, a transaxle 10 is shown in a plan view wherein the upper casing of the housing has been removed. The housing 12 consists of an upper casing 14 and a lower casing 16, and internally, the transaxle assembly includes gearing 18 mounted upon a rotatable shaft 20 supported within the housing 12 upon bearings, and gearing 22 includes a set of gears mounted upon a bushing 24 rotatably supported upon a wheel drive shaft. The gears of gearing 18 and 22 selectively mesh to rotate the shaft 20 at variable speeds depending upon the shifting of the gearing, and the gearing is rotated by an input shaft, not shown, connected to a power source, such as an internal combustion engine, not shown.

A vehicle wheel drive shaft 26 is rotatably mounted within the housing 12 as is the wheel drive shaft 28 which extends through the bushing 24. The drive shafts 26 and 28 are associated with conventional bearings for rotatably supporting the drive shafts within the housing 12. At their outer ends, the shafts 26 and 28 are provided with wheel flanges, not shown, on which the vehicle drive wheels with which the transaxle 10 is associated are mounted. The inner end of the drive shaft 26 has a bevel gear 30 mounted thereon, while the drive shaft 28 is driven through the beveled gear 32.

Differential 34 is mounted within the housing 12 and is driven through the gear 36 mounted upon the rotatable shaft 20. In this manner, rotation of the gearing within the housing 12 rotates the drive shafts 26 and 28 at a rate of rotation determined by the selective shifting of the gearing 18 and 22 by gear shifting mechanism of a conventional nature, not shown.

The casings 14 and 16 include holes 38 defined therein through which bolts 40 may extend for connecting the casings 14 and 16 in a fluid tight connection at the flat assembly surfaces 42 defined on each of the casings. A gasket, or sealing material, is usually located between the assembly surfaces 42 to confine the lubricating oil within the housing 12.

It is to be noted in FIG. 2 that the flat assembly surfaces 42 of the casings 14 and 16 are diametrically related to the wheel drive shafts 26 and 28, i.e. the plane of the assembly surfaces 42 are coincident with a diameter of the shafts 26 and 28, and the axles 26 and 28 are coaxially related to each other. By locating the assembly surfaces 42 with respect to the drive shafts in the aforedescribed manner, assembly of the internal components of the housing 12 is simplified. Each of the assembly surfaces 42 of both casings are provided with semi-cylindrical recesses to receive the bearings of shaft 20, and of shafts 26 and 28, and as the housing 12 includes properly shaped cavities for receiving the internal gearing and other components within the housing, these components are merely "dropped in" the casing 16. With a "split" housing 12 of this type, assembly of a relatively complex transaxle is simplified reducing the likelihood of error, and reducing assembly costs.

The aforedescribed structure and relationships is conventional, as shown in U.S. Pat. No. 4,662,241, and the inventive concepts pertain to the utilization of a brake assembly 44 with the wheel drive shaft 28 wherein the brake assembly will be totally encased within the transaxle housing 12.

The brake assembly 44 includes a hub 46 surrounding the wheel drive shaft 28, and the hub 46 is provided with an outer hexagonal surface 48. The hub 46 is keyed to the shaft 28 for rotation therewith through key 50 received within a key recess 52 defined in shaft 28, and the key is also received within a slot in the hub 46. In this manner, the hub 46 will rotate with the shaft 28 in both directions of shaft rotation.

A plurality of plate type discs 54 are mounted upon the hub hex surface 48. The discs 54 surround the hub and are each provided with a hexagonal opening corresponding to the hexagonal configuration of the hub surface 48. The fit between the disc opening 56 and the hub surface 48 is such that relative rotation between the discs and hub is prevented, but axial displacement of the discs relative to the hub is possible. In this manner, the discs 46 will rotate with the hub 46 and wheel drive shaft 28.

A plate-like shoe 58 is located intermediate each of the discs 54 whereby the shoes 58 and discs 54 constitute a "stack". The shoes 58 are provided with a central circular opening 60 of a diameter slightly greater than the maximum dimension across the hub surface 48. Accordingly, the shoes 58 will not rotate with the shaft 28 but are capable of axial movement relative to the hub 46. At its periphery, each of the shoes 58 is provided with a radially extending tab or stop 62, FIG. 4, which is received within a recess located in the assembly surfaces 42 of casings 14 and 16 wherein such recesses define abutment ledges 64 opposed to the shoe stops 62. Accordingly, the relationship between the stops 62 and the abutment ledges 64 prevents rotation of the shoes 58 about the axis of the wheel drive shaft 28, but the shoes are capable of axial displacement relative to the drive shaft.

Figure 4:
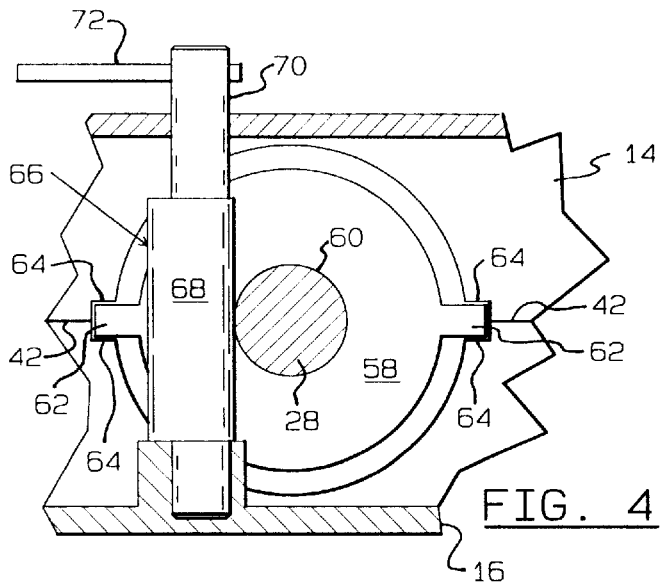
FIG. 4 is an enlarged elevational sectional view taken along Section 4—4 of FIG. 1.
Figure 5:
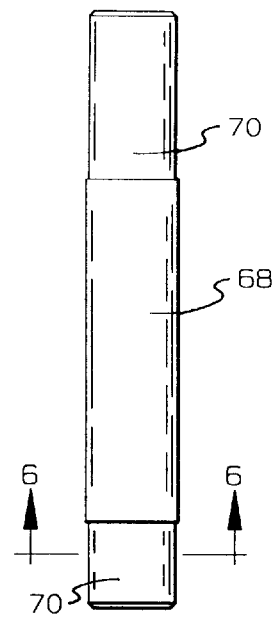
FIG. 5 is a plan view of a cam type brake actuator, per se.
Figure 6:
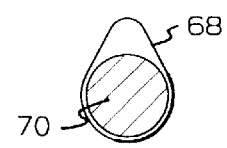
FIG. 6 is an elevational sectional view of the cam actuator taken along Section 6—6 of FIG. 5.
Figure 7:
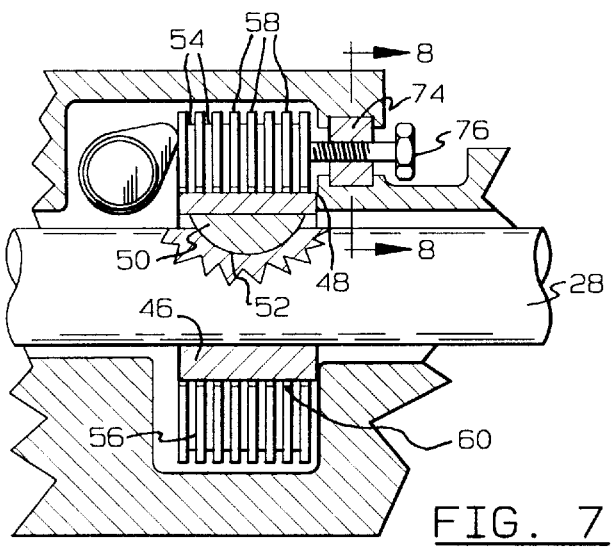
FIG. 7 is an elevational partially sectional view of the compression stop brake wear adjustment.
Figure 8:
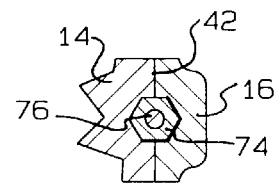
FIG. 8 is an elevational sectional view of the brake wear adjustment taken along Section 8—8 of FIG. 7.

A brake actuator is mounted in the housing 12 for selectively compressing or releasing compression of the stack of discs 54 and shoes 58. In FIGS. 1, 4 and 5, the brake actuator 66 takes the form of a cam 68 mounted upon bearings 70 rotatably supported within suitable bearing structure in the housing casings 14 and 16. The cam 68 is located adjacent an end of the brake assembly 44, FIG. 1, whereby the cam 68 will engage the adjacent shoe 58. It is desirable for the cam to engage a shoe 58, rather than a disc 54, as the cam actuator 68 will be engaging the relatively stationary shoe 58. By rotating the cam 68 by an arm 72 attached to an appropriate brake operating lever, such as a foot pedal, hand lever, or the like, the stack of shoes 58 and discs 54 can be compressed between the cam 68 and the compression stop 76 producing a frictional relationship between engaging discs and shoes. This frictional relationship is transferred to the shaft 28 due to the keying of the discs 54 to the shaft, and the stationary relationship of the shoes 58, rotation-wise, and this frictional force brakes the wheel drive shaft 28 against rotation regardless of the direction of wheel shaft rotation.

The components of the brake assembly 44 may be economically manufactured by high production machining techniques, and the discs 54 and shoes 58 are readily stamped of plate material. As the location of the encased brake assembly 44 within the housing 12 permits the transaxle lubricants to enter the brake assembly, wear within the brake assembly is reduced, yet the high frictional forces between the discs and shoes permits an effective braking action with little wear.

The location of the brake assembly 44 directly upon a wheel drive shaft 28 assures effective braking of the vehicle as the brake structure is directly associated with a vehicle wheel, and not through a vehicle drive shaft differential as is conventional. Accordingly, the brake assembly of the invention provides excellent safety conditions.

The stack of discs 54 and shoes 58 is compressed between the actuator cam 68 and the wear compensator and compression stop located at the opposite end of the stack. The wear compensator and compression stop takes the form of a nut 74 located within complementary hexagonal shaped recesses in the casing surfaces 42 and and a screw 76 associated with the nut 74 engages the adjacent shoe 58 to limit stack axial movement during compression by actuator 68. As wear occurs between the discs and shoes, such wear may be compensated for by rotating the screw 76 slightly relative to its actuator, and replacement of the nut 74 may be readily accomplished to renew the threads. Usually, the nut 74 will be manufactured of a long wearing material of a higher grade than that used to form the casings 14 and 16 providing a superior support for the screw 76 as compared to directly forming a threaded hole in the housing 12.

From the above description, it be appreciated that the encasing of the brake assembly 44 permits a low cost brake for transaxles which is economical to produce, protected within the transaxle housing, directly brakes a wheel drive shaft and permits a variety of actuators to be used therewith.

It is appreciated that various modifications to the inventive concepts may be apparent to those skilled in the art without departing from the spirit and scope of the invention.

I claim:

1. A transaxle drive unit having an encased brake comprising, in combination, a housing having, at least, first and second casings defining a transmission gear receiving chamber and bolted together at a flat assembly surface defining a plane, an axle wheel supporting drive shaft rotatably mounted in said housing having an axis of rotation, bearing means rotatably supporting said drive shaft within said housing wherein said shaft axis substantially lies within said assembly surface plane, a brake assembly mounted on said drive shaft fully encased within said housing, said brake assembly having an axis substantially coincident with said drive shaft axis and substantially lying within said assembly surface plane, and a brake assembly actuator mounted on said housing operatively connected to said brake assembly.

2. In a transaxle drive unit as in claim 1, a brake assembly receiving cavity defined in said first casing 14 in communication with said first casing assembly surface, said brake assembly 44 being received within said cavity.

3. In a transaxle drive unit as in claim 1, a brake assembly 44 including a rotating member 46 mounted on said drive shaft for rotation therewith and a stationary member fixed against rotation relative to said first casing, said members being selectively positioned between engageable and disengaged positions with respect to each other, said brake assembly actuator selectively positioning said members.

4. In a transaxle drive unit as in claim 3, said stationary member including a stop engaging an abutment defined on said first casing upon assembly of said drive shaft and brake assembly with said first casing.

5. In a transaxle drive unit as in claim 4, said rotary member comprising a plurality of discs keyed to said drive shaft for rotation therewith and axially spaced thereon, said rotary members being axially movable upon said drive shaft, said stationary member comprising a plurality of shoes alternately located between adjacent discs and capable of axial displacement with respect to said drive shaft, said discs and shoes defining a stack of brake members, said brake assembly actuator selectively axially compressing and releasing said stack to frictionally engage and release adjacent discs and shoes.

6. In a transaxle drive unit as in claim 5, said actuator including a cam operated pin transversely related to said drive shaft axis.

7. In a transaxle drive unit as in claim 5, a threaded compression stop and wear compensator engaging said stack of brake members in opposed relation to said brake assembly actuator.

8. A transaxle drive unit having an encased brake comprising, in combination, a housing having, at least, first and second casings defining a transmission gear receiving chamber and bolted together at a flat assembly surface defining a plane, a drive shaft rotatably mounted in said housing having an axis of rotation, bearing means rotatably supporting said drive shaft within said housing wherein said shaft axis substantially lies within said assembly surface plane, a brake receiving cavity defined in each casing in communication with the associated assembly surface, said cavities of said first and second casing aligning upon assembly of said casings to define a brake assemble receiving chamber, an abutment ledge defined in each of said cavities, a brake assembly mounted on said drive shaft received within said brake assembly receiving chamber, said brake assembly including an axially extending stack of alternately arranged discs and shoes, said discs being keyed to said drive shaft for rotation therewith and capable of axial movement on said shaft, said shoes including radially extending stops engaging said abutment ledge preventing rotation of said shoes and capable of limited axial movement relative to said shaft, and a brake assembly actuator mounted on said housing operatively connected to said brake assembly for selectively axially compressing said stack to engage said discs and shoes to brake rotation of said drive shaft.

9. In a transaxle drive unit as in claim 8, said actuator including a cam operated pin transversely related to said drive shaft axis.

10. In a transaxle drive unit as in claim 8, a threaded compression stop and wear compensator engaging said stack of brake members in opposed relation to said brake assembly actuator.

* * * * *